March 17, 1931.    M. P. SARFATY    1,796,668
RESTAURANT SERVICE SYSTEM AND APPARATUS
Original Filed Jan. 18, 1927    4 Sheets-Sheet 3
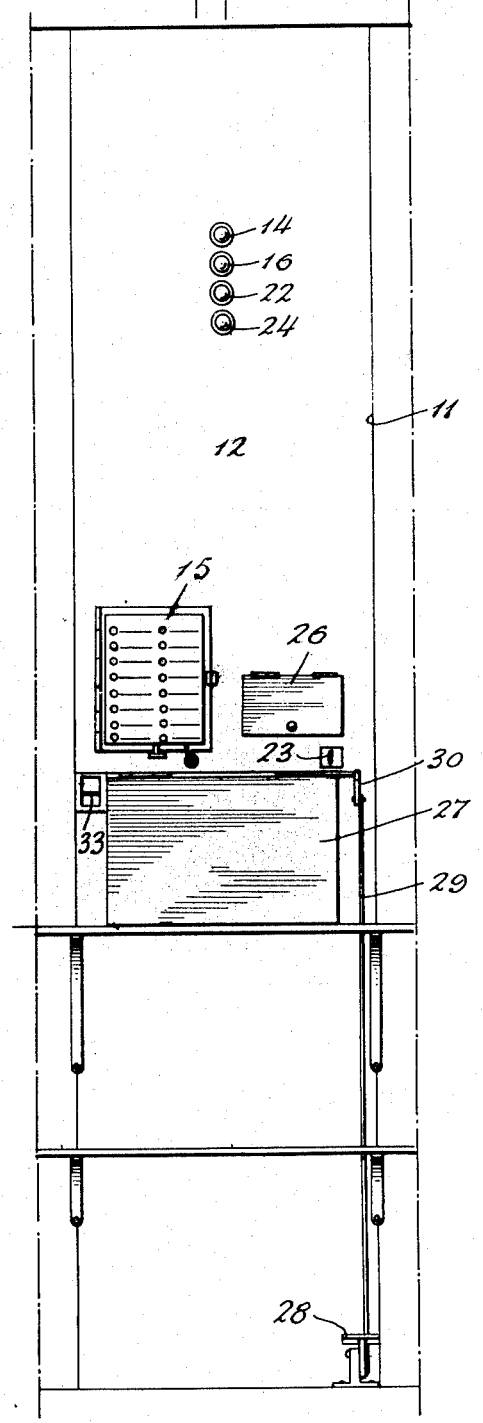
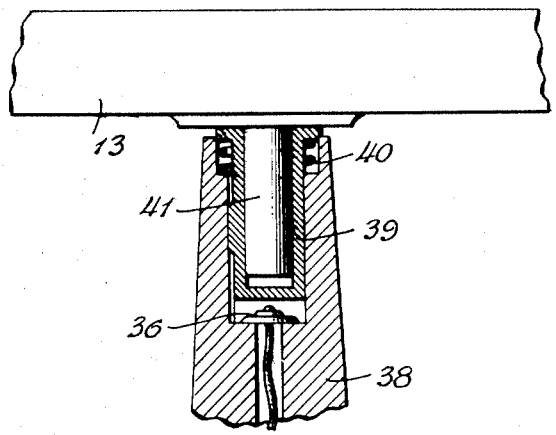
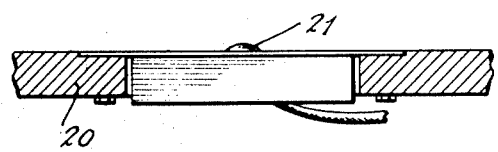
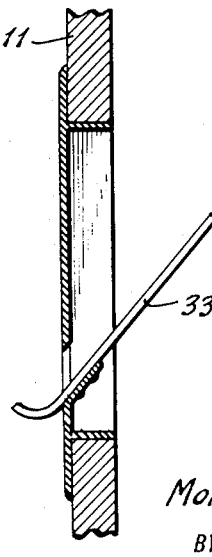
INVENTOR
MORTON P. SARFATY
BY Richards & Geier
ATTORNEYS

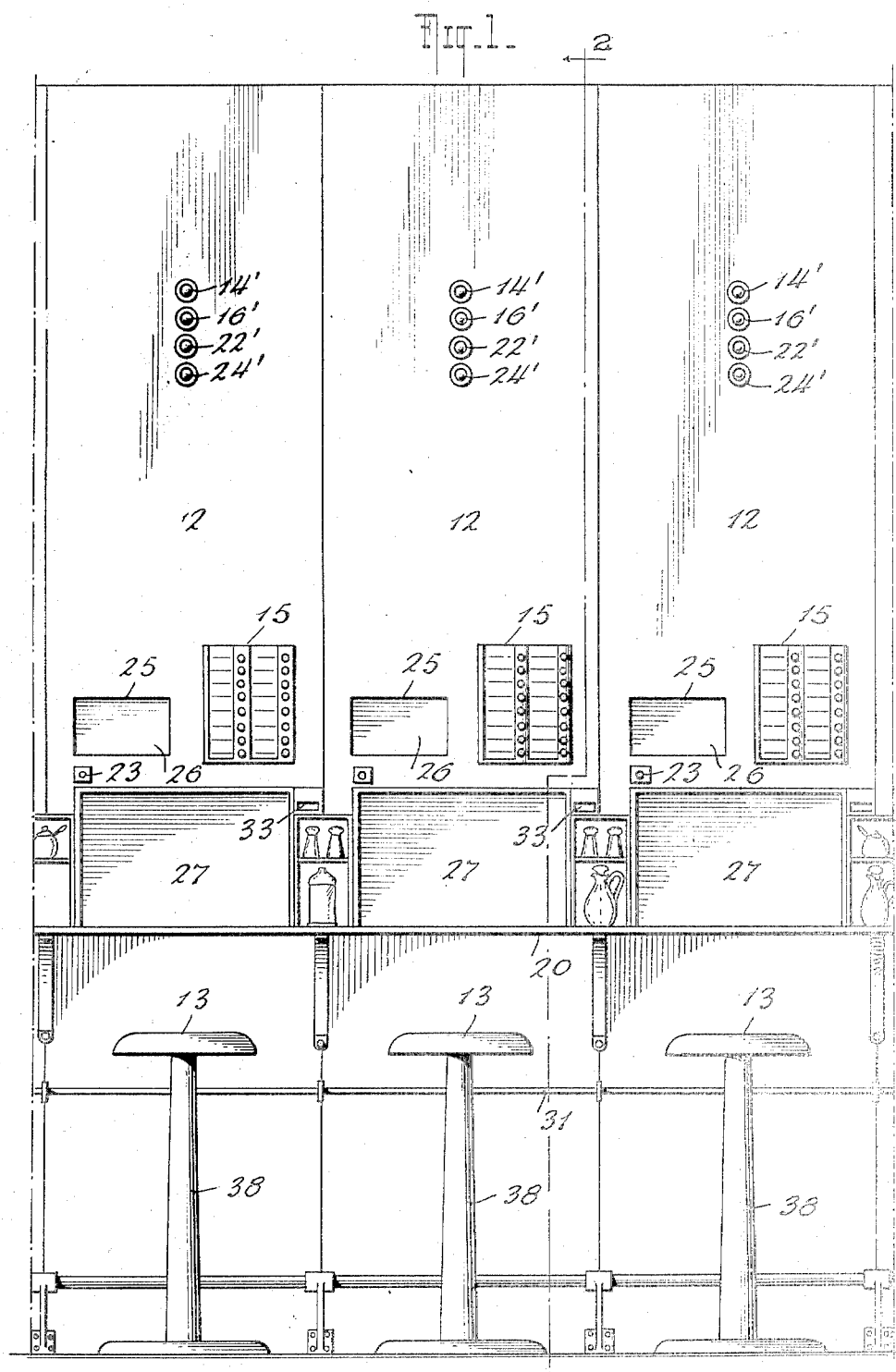

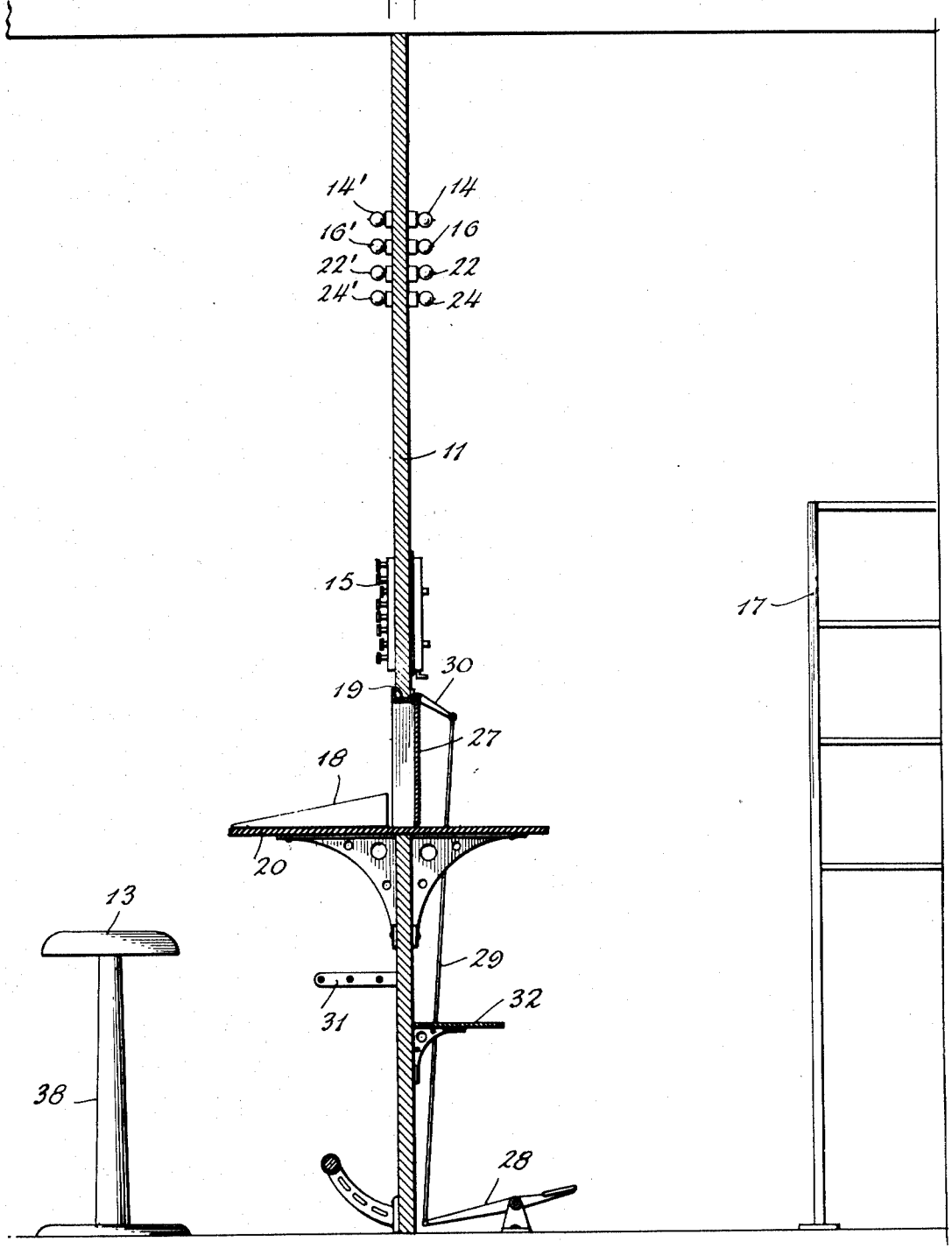

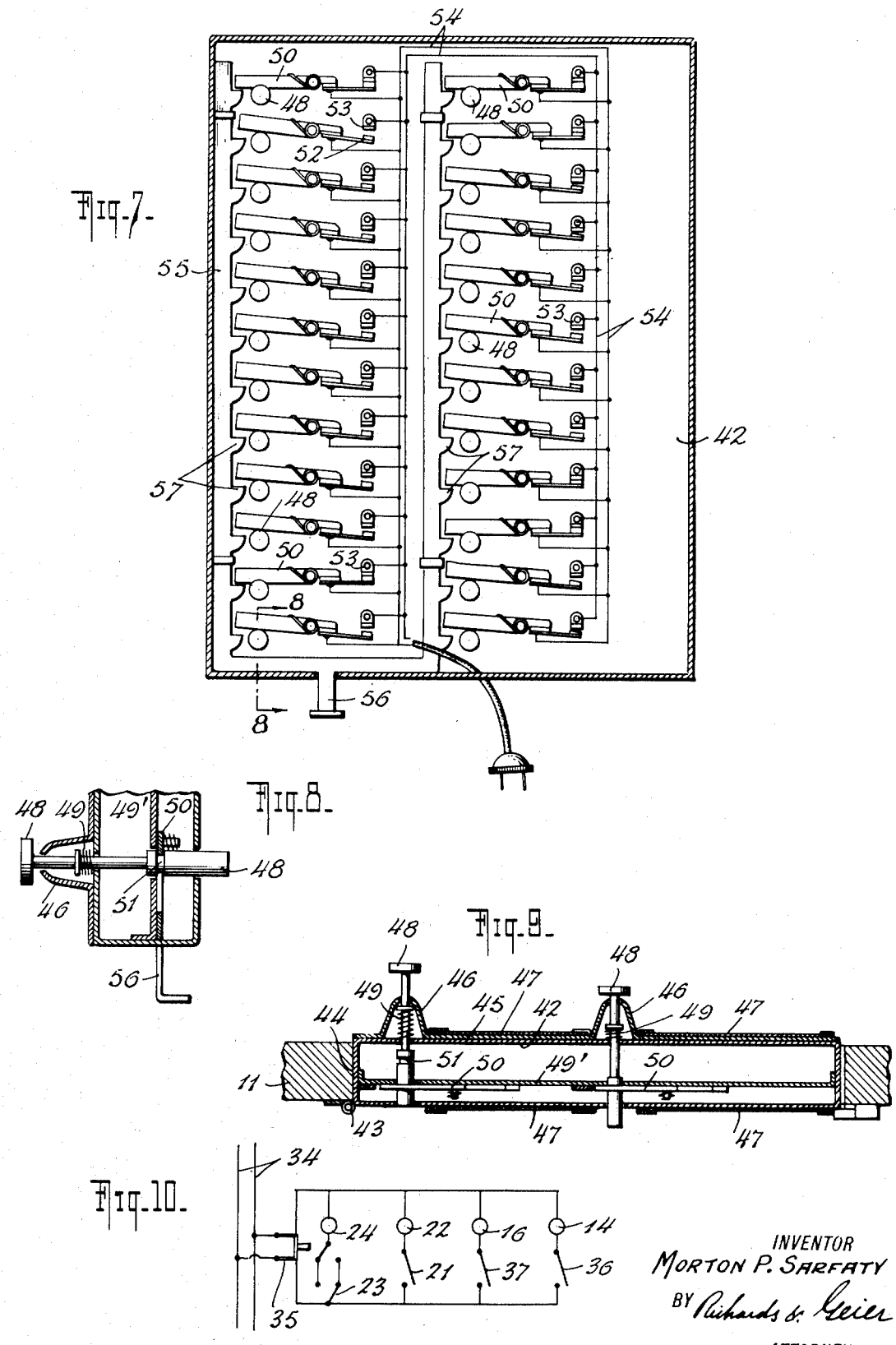

Patented Mar. 17, 1931

1,796,668

UNITED STATES PATENT OFFICE

MORTON P. SARFATY, OF LARCHMONT, NEW YORK

RESTAURANT SERVICE SYSTEM AND APPARATUS

Application filed January 18, 1927, Serial No. 161,716. Renewed August 5, 1930.

This invention relates to improvements in restaurant service systems and apparatus, and has for one of its objects to provide an improved system whereby persons may be expeditiously served with a minimum of effort.

Another object is to provide a system by means of which a person may place an order for food by operating a device, including a plurality of indicating members, to designate the articles desired after which the order is filled by an attendant.

A further object is the provision of a system wherein, by the aid of signals, an attend15 ant is enabled to ascertain when a certain seat is occupied by a patron, when an order is placed by the patron and when said patron vacates his seat.

The above and other objects will appear more clearly from the following detail description, when taken in connection with the accompanying drawings, which illustrate a preferred embodiment of the inventive idea.

In the drawings—
Figure 1 is a front elevation of three units of the apparatus employed in connection with the invention;

Figure 2 is a vertical longitudinal section through one of the units taken on the line 2—2 of Figure 1;

Figure 3 is a rear elevation of one of the units;

Figure 4 is a fragmentary section of the seat associated with each unit;
Figure 5 is a fragmentary sectional view through the table forming a part of each unit;

Figure 6 is an enlarged fragmentary sectional view through the panel illustrating the chute in which the patron's check is deposited by the attendant;

Figure 7 is an enlarged vertical sectional view through the menu indicating device;
Figure 8 is a section on the line 8—8 of Figure 7;

Figure 9 is a horizontal section through the menu indicating device; and

Figure 10 is a diagrammatic view of the signal control circuit for each unit.

The preferred form of the invention as illustrated in the drawings, is shown as comprising a panel or partition 11 which is divided into a plurality of similarly constructed units 12 each designed to accommodate one patron. The panel 11 is conveniently arranged in any desired manner so as to secure the maximum number of units for any allotted floor space and divides said space into a section on one side thereof for the accommodation of the patrons and another space on the opposite side for the service department in which the attendants operate.

In carrying out the system involved, when a patron occupies a seat 13, a pair of signals in the form of incandescent lamps 14 and 14', which may be red in color and which are arranged on opposite sides of the panel 11, are lighted to indicate to the attendant that a patron has seated himself, the attendant observing the lamp 14 while the patron may see the lamp 14'. The patron now proceeds to place his order by operating the menu indicating device, generally indicated at 15, individual to the unit 12 before which he is seated and when this device is operated a second pair of lamps 16 and 16', which may be white in color, are lighted. The attendant observes, on his side of the panel 11, the articles ordered on the indicating device and then proceeds to fill the order, a food rack 17 being placed conveniently for this purpose. The order is preferably placed upon a tray 18 and then passed, from the attendant's side, through an opening 19 formed in the panel and placed upon the table 20 supported by said panel just below said opening and in front of the patron's seat. The opening 19 is normally closed by a door 27 operated by a treadle 28 through the medium of links 29 and 30.

The placing of the tray 18 on the table as described, is utilized to effect the operation of a switch 21 on said table which is engaged by the tray and thus effects illumination of a third pair of lamps 22 and 22', which may be green in color. Should the patron, during the course of his meal, wish to communicate with the attendant for any reason he may do so by operating a switch 23 and thereby illuminate the lamps 24 and 24', which may be blue in color. The attendant observing the lighted lamp 24 may communicate with the patron through an opening 25 in the panel which is normally closed by a door 26. The switch 23 is of a type which permits of the lamps 24, 24' being also under the control of the attendant so that after any special service is rendered in response to the lighting of the lamp 24, said lamps may be extinguished from the attendant's side of the panel.

At the time of placing the tray upon the table 20 the attendant extinguishes the lamps 16, 16' in a manner to appear in the course of the description, thus leaving only the lamps 14, 14' and 22, 22' illuminated and thereby indicating that the patron has been served with his order. At the conclusion of the meal the patron arising from the seat 13 causes the extinguishing of the lamps 14, 14', thereby leaving only the lamps 22, 22' illuminated. Observing this condition, the attendant is informed that the seat 13 has been vacated and that the tray 18 is still on the table. The tray is then removed through the opening 19 by opening the door 27, in the manner previously described. The removal of the tray releases the switch 21, and thus extinguishes the lamps 22, 22', thereby indicating that the unit is clear and ready for another patron.

In accordance with the arrangement above described, it will be obvious that the patron may be served directly at the place where he is seated and thus obviate the inconvenience of similar types of serving systems, such as cafeterias and others of the self-serving type, wherein the patron usually selects a seat at some point more or less remote from the place where he secures his service. For the further convenience of the patrons a parcel rack 31 may be secured to the panel 11 beneath the table 20. A shelf 32 on the other side of the panel and below the table may be utilized for storing different articles, such as eating utensils and the like.

Each unit 12 is provided with a check holder, in the form of a chute 33, at a convenient place upon the panel, which chute projects through said panel so that the attendant after serving the order may place the check on the chute with the lower end thereof projecting through to the front of the panel where it may be obtained by the patron after he has completed his meal. If, during the progress of the meal, he should order other articles the attendant may temporarily withdraw the check from the chute to alter the amount thereof.

In Figure 10 a diagrammatic view of the circuit for each unit is shown. For simplicity the various lamps 14, 14', 16, 16', 22, 22' and 24, 24' are indicated by single lamps and it will be assumed that those shown are the attendant's lamps 14, 16, 22 and 24. These lamps are connected in parallel with the main circuit including the conductors 34 and a switch 35 is utilized to control the connection of each unit to said conductors. The switch 36 controlling the lamp 14 is the switch mounted in the seat 13. The switch 37 is indicative of a plurality of switches on the menu indicating device, any one of which is utilized to control the light 16. The light 22 is controlled by the switch 21, as previously described, when a tray is placed upon the table 20 while the lamp 24 is controlled by the switch 23, which is commonly known as a three-way switch.

The seat shown in detail in Figure 4 comprises a standard 38 in the upper end of which is slidably and non-rotatably mounted a bearing 39 yieldably supported by a spring 40. Carried by the seat proper is a pin 41 rotatably mounted in the bearing 39. As pressure is applied to the seat the bearing is forced downwardly against the tension of the spring 40 until the lower end of said bearing contacts the switch to close the circuit for lighting the lamps 14, 14'.

The construction of the menu indicating device will now be described in detail, and since these devices are alike a description of one will suffice. In the form shown, each device consists of a casing 42 pivotally mounted at 43 in an opening 44 formed in the panel 11. On the outer side of the casing facing the patron there is provided a card supporting plate 45 having the outwardly projecting bosses or ribs 46 alongside of which provision is made for removably mounting the menu cards 47. Duplicates of these cards are also mounted on the inner side of the casing 42 so as to be observed by the attendant. A plurality of indicating members, in the form of keys or plungers 48, are supported in the casing and extend through the bosses 46. These keys are yieldably held in an outwardly projected position by coil springs 49 and each of the keys is individual to and arranged opposite one of the articles on the menu cards, the normal position of a key being shown at the left of Figure 9, while at the right of said figure a key is shown in its operated position. When it is desired to order a certain article on the menu, the key corresponding to said article is depressed to project the inner end thereof beyond the adjacent surface of the casing 47, so as to indicate to the attendant that the particular article corresponding to said key has been ordered. It is desirable that the various keys be temporarily retained in their operated position in order to give the attendant an opportunity to ascertain the complete order desired by the patron. For this purpose there is mounted within the casing 42 a partition 49' which pivotally supports a plurality of spring pressed levers 50, which normally engage the enlarged inner ends of the keys. When one of the keys is depressed its associated lever 50 will be forced by spring pressure into an annular groove 51 formed in the key so as to prevent the return of the key to its normal position when pressure is relieved therefrom. One end of each lever 50 carries a contact 52 which engages another contact 53 when the lever is forced into the groove 51 of its key. The contacts 52 and 53 comprise the switch 37 (Figure 10) and the engagement of these contacts is utilized to close the circuit including the conductors 54 for lighting the lamps 16, 16', thereby indicating to the attendant that the patron is placing an order. After the attendant has filled the order and is passing the tray through the opening 19 in the panel on to the table, he may at the same time restore the various operated keys of the indicating device to their normal position by operating a trip device 55 in the form of a substantially U-shaped frame slidably mounted within the casing 42 and having a projection 56 at its lower end extending through said casing within reach of said attendant. This trip device is provided with a plurality of projections 57 each of which is individual to one of the levers 50 and engages therewith when the device is forced upwardly in the casing so that any lever, which is at the time in engagement with a groove in one of the keys, will be elevated to its normal position and said key will restore to its normal position under the influence of its spring 49.

What is claimed is:

1. In a restaurant service system, a partition, a table and seat arranged at one side of said partition, a signal on the other side of said partition, a menu-indicating device on said partition, means controlled from said seat for operating said signal for signalling an attendant when a customer occupies said seat, a door in said partition adjacent said table through which a tray may be placed on said table, a second signalling device on said other side of the panel, means whereby said second signalling device is actuated upon operation of said menu-indicating device, another signalling device also on said other side of the panel, and means whereby said other signalling device is actuated by the placing upon said table of a tray containing the order filled in accordance with said menu-indicating device for subsequently indicating to said attendant that the order has been filled.

2. In a restaurant service system, a partition, a table and seat arranged at one side thereof, a menu-indicating device on said partition, a signal on the other side of said partition, means controlled from such seat for operating said signal for signalling an attendant when a customer occupies said seat, a door in said partition adjacent said table through which a tray may be placed on said table, a second signalling device on said other side of the panel, means whereby said signalling device is actuated upon operation of said menu-indicating device, another signalling device also on said other side of the panel, means whereby said other signalling device is actuated by the placing upon said table of a tray containing the order filled in accordance with said menu-indicating device for subsequently indicating to said attendant that the order has been filled, and means whereby said other signalling device becomes ineffective upon the removal of the emptied tray.

3. In a restaurant service system, a partition, a plurality of tables arranged at one side thereof, a plurality of seats on the same side of the partition, each of said seats being placed adjacent one of said tables, a plurality of apertures in said partition through which trays may be placed, one of said apertures being adjacent each of said tables, a plurality of menu-indicating devices on said partition, one of said menu-indicating devices being arranged adjacent each of said tables, a plurality of signals on the other side of said partition, each of said signals corresponding to one of said seats, means controlled from each of said seats for operating the corresponding signal for signalling an attendant when a customer occupies said seat, said signals being visible from all points behind said partition, a plurality of other signalling devices on said other side of the panel, each of said second signalling devices corresponding to one of said menu-indicating devices, means whereby each of said second signalling devices is actuated upon operation of the corresponding menu-indicating device, a plurality of other signalling devices also on said other side of the panel, each of said other signalling devices corresponding to one of said tables, and means whereby each of said other signalling devices is actuated by the placing upon the corresponding table of a tray containing the order filled in accordance with said menu-indicating device for subsequently indicating to said attendant that the order has been filled.

4. In a restaurant service system, a partition, a plurality of tables arranged at one side thereof, a plurality of seats on the same side of the partition, each of said seats being placed adjacent one of said tables, a plurality of apertures in said partition through which trays may be placed, one of said apertures being adjacent each of said tables, a plurality of menu-indicating devices on said partition, one of said menu-indicating devices being arranged adjacent each of said tables, a plurality of signals on the other side of said partition, each of said signals corresponding to one of said seats, means controlled from each of said seats for operating the corresponding signal for signalling an attendant when a customer occupies said seat, said signals being visible from all points behind said partition, a plurality of other signalling devices on said other side of the panel, each of said second signalling devices corresponding to one of said menu-indicating devices, means whereby each of said second signalling devices is actuated upon operation of the corresponding menu-indicating device, a plurality of other signalling devices also on said other side of the panel, each of said other signalling devices corresponding to one of said tables, means whereby each of said other signalling devices is actuated by the placing upon the corresponding table of a tray containing the order filled in accordance with said menu-indicating device for subsequently indicating to said attendant that the order has been filled, and means whereby each of said other signalling devices becomes ineffective upon the removal of the emptied tray.

In testimony whereof I have affixed my signature.

MORTON P. SARFATY.